Patented Aug. 22, 1944

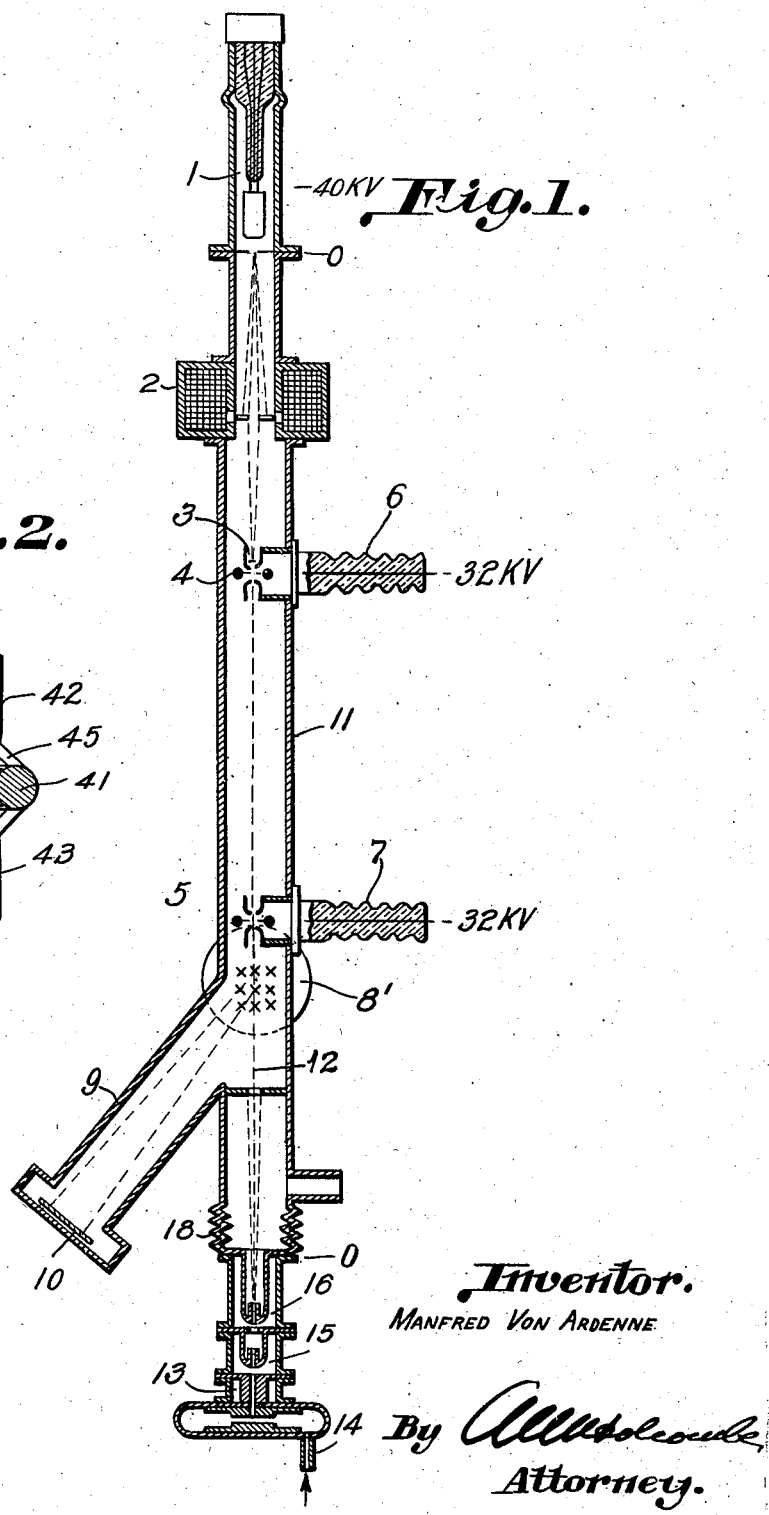

2,356,633

UNITED STATES PATENT OFFICE 2,356,633

ELECTRONIC MICROSCOPE

Manfred von Ardenne, Berlin-Lichterfelde, Germany; vested in the Alien Property Custodian Application January 28, 1941, Serial No. 376,309
In Germany October 19, 1939

11 Claims. (Cl. 250—49.5)

The invention relates to improvements in electronic microscopes.

In the microscopic technique there is a desire to simplify the methods of carrying out microscopic and submicroscopic manipulations on the objects to be tested, since the hitherto known steel or glass probes employed as micromanipulators have not the fineness necessary for many applications of electron optics.

The object of the invention is to improve the method of carrying out investigations with the aid of an electronic microscope. According to the invention, an ion-producing device is combined with an electronic microscope, from which device an ion ray probe may be directed onto the object. Such an ion ray probe presents the advantage over the mechanical probes hitherto employed in biological investigations that it has a far greater sharpness and that the injuries which may occur in the layers located above and below the object layer under consideration are small as compared with the injuries occurring at the probe point and as compared with the damages caused when employing mechanical probes. When using the ion ray probe, care should be taken that the probe, owing to the spatial diffusion of ion rays, has its complete sharpness only on the surface of the object layer. At the point of incidence of the ion probe, the kinetic energy of the ions impinging upon the object causes a local evaporation of the matter so that the ion probe may also be employed for cutting and perforating particles of the object to be tested. The ion probe has the advantage over an electron probe that only the former can be employed with an electronic microscope of the type described below and that its effect is greater.

When performing the manipulations, it is desirable to know the exact point upon which the ion ray probe impinges. To this end, the invention offers a very simple means, since, when employing the probe beam in connection with the electronic microscope, the device may be so designed that the point of incidence of the ion ray probe can be directly observed in the electron-optically magnified image of the object. In order to enable a manipulation of the above-mentioned kind at a given point of the object, devices are employed, according to the invention, by means of which a relative displacement between the object and the ion ray probe may be effected. To this end, for instance, the object may be so arranged as to permit a mechanical displacement. Another possibility consists in displacing the ion ray producing device relatively to the stationary object and perpendicularly to the axis of the ray. Finally, an electric means may also be employed for deflecting the ion ray for the above-mentioned purposes.

A rather simple arrangement is obtained if the microscope is so designed that the electron rays pass through the object from one direction and the ion rays from another direction. To enable an observation of the object with the aid of the electronic microscope during the performance of micromanipulations, the path of ray of the electronic microscope is slightly deflected according to the invention behind the microscope objective, preferably behind the projection lens, by means of a homogeneous magnetic field. Furthermore, electrostatic lenses are preferably employed as optical systems. Since the ion rays are not appreciably deflected by the homogeneous auxiliary magnetic field, a canal ray system for producing ion rays of a small initial cross-section may be disposed substantially on the optical axis of the microscope proper so that the canal ray system and the parts of the electronic microscope lying behind the point of deflection are spaced from each other. Since the refraction of electrostatic lenses on electrons and ions is the same, provided the absolute values of the operating voltages of the ion ray source and of the electron ray source are equal, the greatest sharpness of the ion probe in the plane of the object is automatically obtained when adjusting for the greatest sharpness of the electron image.

It is preferable to employ control devices, by means of which the operating voltage of the ion ray producing device may be varied, in order to magnify the diameter of the ion probe or to correct faults of compensation of the second order.

The invention makes it also possible to produce holes of submicroscopic fineness in foils in order to obtain filters and to observe at the same time the boring operation in detail with the aid of the electronic microscope. To produce a plurality of filter holes, the canal ray producing device may be so designed that a plurality of probes is directed onto the object. To this end, for instance, the electrode from which the canal ray is emitted may be designed in the form of a sieve.

In Fig. 1 of the accompanying drawing is shown an embodiment of the invention in diagrammatic form, while Fig. 2 illustrates a detail of the same embodiment.

I denotes the electron-emitting source which is operated, for instance, at a voltage of −40 kv. The electron rays are converged onto an object 3 with the aid of a condenser coil 2. For the electron-optical magnification of the object, two electrostatic lenses 4 and 5 are employed whose voltage bushings are denoted by the numerals 6 and 7. 4 is the objective lens and 5 the projection lens. The construction of these lenses is apparent from Fig. 2. Each lens structure comprises a ring-shaped inner electrode 41 and two cup-shaped outer electrodes 42 and 43 spaced and insulated from the inner electrode as indicated by spacers 45. In the path of the electron rays behind the projection lens 5 is arranged a magnetic auxiliary field winding (not illustrated) which serves to deflect the electron rays in such a manner that they fall into the lateral tube 9. The lines of force of the deflecting field produced by the winding extend perpendicularly to the plane of illustration as is indicated at 8. The electron-optically magnified image can be viewed on a fluorescent screen 10. The tube 11 of the electronic microscope is extended in the direction of the objective axis as indicated at 12. To the lower end of the microscope is connected a canal ray tube 13 serving to produce ion rays. The current supply conductor for the gas necessary to operate the canal ray tube is denoted by the numeral 14. The canal ray tube is, for instance, operated at a voltage of +40 kv. 15 and 16 denote two acceleration zones for the ion rays. 17 is the pump connection for the electronic microscope. The ion rays are not influenced by the auxiliary magnetic field 8; they pass through the lenses 5 and 4 and strike the object 3 in the form of a fine probe. The effect of the ray probe can be directly observed on fluorescent screen 10. As mentioned above, devices must be employed in order to enable a selection of the point of the object upon which the ion ray impinges. To this end, the canal ray tube 13 is shifted in a direction perpendicular to the direction of the ray. To enable the tube 13 to be shifted, the latter is secured to the lower end of the tube 12 by means of a resilient body 18.

A suitable baffle having an orifice for passage of ion rays (not shown) may also be interposed adjacent the flexible connection, 18, so that the gas pressure in the canal ray tube will not interfere with the high vacuum of the electron microscope.

What is claimed is:

1. An electronic microscope having means for holding an object in a fixed position, means for producing an electron beam, an electronic means for causing said beam to produce an image of the object, in combination with ion ray means associated with said microscope and positioned to direct an ion ray probe onto the object and means connecting said ion ray means with the microscope for permitting the movement of the ion ray means relative to the microscope and the object holding means in order to permit shifting the point of incidence of said probe relative to the object.

2. In combination, an electronic vacuum vessel, an electron source in said vessel for producing an electron beam, holding means for accommodating an object in said vessel, electronic lens means for causing said electron beam to produce a microscopic image of the object upon a screen, a screen for receiving said image, an ion source also disposed in said vessel and arranged to direct an ion ray probe onto the object while said image is being observed.

3. In combination, an electronic vacuum vessel, an electron source in said vessel for producing an electron beam, holding means for accommodating an object in said vessel, electronic lens means for causing said electron beam to produce a microscopic image of the object, an ion source also disposed in said vessel and arranged to direct an ion ray probe onto the object, said electron source and said ion source being disposed at opposite sides of said holding means so as to have said electron beam and said ion ray probe impinge upon the object in opposite directions.

4. An electronic microscope having means for holding an object, means for producing an electron beam, and electronic lens means for causing said beam to produce an image of the object, in combination with ion ray means adjacent said microscope positioned to direct an ion ray probe onto the object, said electron-producing means and said ion ray means having a substantially common geometrical axis, electron-deflecting field means interposed in the path of said electron beam for causing said image to appear laterally of said axis, and screen means disposed at the place of said deflected image.

5. An electronic microscope having means for holding an object, means for producing an electron beam, and electronic lens means for causing said beam to produce an image of the object, in combination with ion ray means adjacent said microscope positioned to direct an ion ray probe onto the object, said electronic microscope and said ion ray means being arranged relative to each other so as to have said electron beam and said ray probe impinge upon the object from different directions, and means disposed between said holding means and said ion ray means for producing a homogeneous magnet field in order to deflect said electron beam laterally from its original direction after its passage through the object.

6. An electron-microscopical apparatus, comprising in an electronic vacuum vessel, in combination, an electron source for producing an electron beam, means for holding an object in the path of said beam, electrostatic lens means for causing said beam to produce a magnified image of the object, an ion source arranged relative to said holding means and lens means so as to direct an ion ray probe through said lens means onto the object for manipulating the object to be magnified.

7. An electronic microscope having means for holding an object, means for producing an electron beam, and electronic lens means for causing said beam to produce an image of the object in combination with ion ray means associated with said microscope for directing an ion ray probe onto the object, and means for effecting a relative movement in a plane perpendicular to the path of the electron beam between said holding means and said ion ray means in order to permit shifting the point of incidence of said probe relative to the object.

8. An electron-microscopical apparatus, comprising in an electronic vacuum vessel, in combination, an electron source for producing an electron beam, means for holding an object in the path of said beam, electron-optical lens means for causing said beam to produce a magnified image of the object, screen means for receiving said image disposed laterally of the optical axis of said lens means, electron-deflecting field means arranged between said lens means and said screen means to divert said beam onto said screen means after the passage of said beam through said lens means, an ion source for producing an ion ray probe disposed at the side of said lens means opposite to said holding means so as to direct the ray probe through said lens means onto the object.

9. An electronic microscope having means for holding an object, means for producing an electron beam, and electronic lens means for causing said beam to produce an image of the object, in combination with ion ray means adjacent said microscope positioned to direct an ion ray probe onto the object, said electron-producing means and said ion ray means having substantially equal absolute operating voltages in order to automatically focus said ray probe onto the object when focusing said image.

10. An electron-microscopical apparatus, comprising in an electronic vacuum vessel, in combination, an electron source for producing an electron beam, means for holding an object in the path of said beam, lens means for causing said beam to produce a magnified image of the object, an ion source arranged relative to said holding means and lens means so as to direct an ion ray probe through said lens means onto the object for probing the object to be magnified, and means for varying the operating voltage of said ion source in order to control the effect of said lens means on said ion ray probe.

11. The method of electron-microscopic observation of objects which comprises subjecting selected portions of the object to the impact of ion rays while subjecting it to the magnifying electron beam.

MANFRED VON ARDENNE.